(12) United States Patent
Gibbons et al.

(10) Patent No.: US 6,534,139 B1
(45) Date of Patent: Mar. 18, 2003

(54) POLYOLEFIN-TIE MATERIAL FREE BARRIER CARTON WITH POLYETHYLENE TEREPHTHALATE PRODUCT CONTACT LAYER

(75) Inventors: Charles E. Gibbons, Milford; Paul C. Huzyak; Scott P. Andersen, both of Loveland, all of OH (US)

(73) Assignee: International Paper Company, Tuxedo Park, NY (US)

( * ) Notice: Subject to any disclaimer, the term of this patent is extended or adjusted under 35 U.S.C. 154(b) by 0 days.

(21) Appl. No.: 09/321,880

(22) Filed: May 28, 1999

Related U.S. Application Data
(60) Provisional application No. 60/087,839, filed on Jun. 3, 1998.

(51) Int. Cl.[7] .................. B32B 1/08; B32B 27/10; B32B 27/06
(52) U.S. Cl. .............. 428/35.7; 428/35.2; 428/35.4; 428/35.7; 428/481; 428/483; 428/510; 428/511; 428/520; 428/514; 428/480; 428/182
(58) Field of Search .............. 428/35.2, 35.4, 428/35.7, 481, 483, 510, 520, 511, 514, 480, 182

(56) References Cited

U.S. PATENT DOCUMENTS

| | | | |
|---|---|---|---|
| 4,284,671 A | 8/1981 | Cancio et al. ............... 428/35 |
| 4,455,184 A | * 6/1984 | Thompson ............... 156/244.11 |
| 4,528,219 A | 7/1985 | Yamada et al. ............... 428/35 |
| 4,564,541 A | 1/1986 | Taira et al. .................... 428/35 |
| 4,675,219 A | 6/1987 | Muneki et al. ............... 428/35 |
| 4,698,246 A | * 10/1987 | Gibbons et al. .............. 428/35 |
| 4,753,832 A | * 6/1988 | Brown et al. ................. 428/35 |
| 4,774,114 A | 9/1988 | Moritani et al. .............. 428/35 |
| 4,883,696 A | 11/1989 | Iwanami et al. ........... 428/35.4 |
| 4,929,482 A | 5/1990 | Moritani et al. .......... 428/36.4 |
| 4,977,004 A | 12/1990 | Bettle, II et al. .......... 428/36.7 |
| 4,990,382 A | 2/1991 | Weissenstein et al. ..... 428/35.7 |
| 5,232,754 A | 8/1993 | Waugh ........................ 428/367 |
| 5,320,889 A | 6/1994 | Bettle, III ................. 428/36.6 |
| 5,506,014 A | 4/1996 | Minnick .................... 428/35.7 |

FOREIGN PATENT DOCUMENTS

AU  8549279  * 5/1986

* cited by examiner

Primary Examiner—Harold Pyon
Assistant Examiner—Marc Patterson
(74) Attorney, Agent, or Firm—Hoffman, Wasson & Gitler; Melvin D. Fletcher

(57) ABSTRACT

A laminate structure for producing paperboard or polymer containers and blow molded bottles containing a barrier structure of layer(s) of polyethylene terephthalate and a layer of ethylene vinyl alcohol copolymer, wherein no polyolefin based tie layers are used in the structure. The container or bottle produced therefrom is recyclable and has dimensional stability.

11 Claims, 3 Drawing Sheets

POLYOLEFIN-TIE MATERIAL FREE BARRIER CARTON WITH POLYETHYLENE TEREPHTHALATE PRODUCT CONTACT LAYER

This application claims the benefit of provisional application 60/087,839 filed Jun. 3, 1998,

BACKGROUND OF THE INVENTION

The invention relates to an improved container structure having good moisture and barrier properties and superior structural integrity. In addition, the unique barrier laminate structure does not require a tie layer to bond or adhere the barrier and stiffness layer. Additionally, the invention addresses an unique blend of a barrier and stiffness material in one layer to provide an excellent barrier structure. The unique structures can take the form of a paperboard based container as well as a blow molded bottle structure, both being recyclable due to the exclusion of a polyolefin-based tie layers. The structure relies on polyethylene terephthalate for structural integrity in combination with an amount of ethylene vinyl alcohol copolymer for its oxygen and moisture barrier properties. Further, in the paperboard based structure, the use of polyethylene terephthalate enhances structural integrity and prevents unwanted carton bulge.

The PET/EVOH based structures have many valuable benefits, they are recyclable, they have dimensional stability (bulge resistance), they provide flavor scalping resistance, they contain oxygen barrier properties, they have score crack resistance, they exhibit reduced contaminant migration, they have improved abuse resistance, they have improved printability and do not require tie layers.

Prior structures using various barrier materials have always used polyolefin materials or polyolefin based materials as tie layers or as product contact layers (matte) for heat sealability purposes. Use of these materials has made it extremely difficult to recycle the structures.

Structures and laminates as depicted in U.S. Pat. Nos. 4,284,671; 4,774,114; 4,929,482; 4,977,004; 4,528,219; 4,990,382; 4,883,696; 5,506,014; 5,320,889; 5,232,754; 4,675,219; and 4,564,541 all require the use of polyolefins or polyolefin based materials for producing the laminates or bottle structures disclosed therein. They all fall short of the novel recyclable polyolefin-free structure of the invention.

It is an objective of the present invention to provide an improved laminate container structure or blow molded bottle having good moisture and barrier properties and having superior structural integrity.

A further object of the invention is to provide a structure or bottle that does not require a tie layer to bend or adhere the barrier and stiffness layer.

It is a further objective of the present invention to provide a structure or bottle that is recyclable.

SUMMARY OF THE INVENTION

Paperboard-based laminate structures which accomplish the above-identified desired benefits and have the required properties include, but not limited to the following:

| | | | |
|---|---|---|---|
| HSPET | HSPET | HSPET | HSPET |
| PET | SUBSTRATE | SUBSTRATE | PET |
| SUBSTRATE | EVOH | PET | SUBSTRATE |
| EVOH | HSPET | EVOH | PET |
| HSPET | | PET | EVOH |
| | | HSPET | PET |
| | | | HSPET |
| HSPET | HSPET | HSPET | HSPET |
| PET | SUBSTRATE | SUBSTRATE | SUBSTRATE |
| SUBSTRATE | HSPET | HSPET | HSPET |
| HSPET | EVOH/MXDA BLEND | EVOH | PET |
| MXDA | HSPET | HSPET | HSPET |
| HSPET | | | EVOH |
| | | | HSPET |
| HSPET | | | |
| PET | | | |
| SUBSTRATE | | | |
| PET | | | |
| HSPET | | | |
| EVOH | | | |
| HSPET | | | |

HSPET - Heat-Sealable Polyethylene Terephthalate
PETA - Acid-Modified Polyethylene Terephthalate
PETG - Glycol-Modified Polyethylene Terephthalate
PET - Polyethylene Terephthalate
Mechanical Stable Structure Substrate - Bleached Paperboard, Unbleached Paperboard, Corrugated Board, HDPE, Propylene, Polyethylene Terephthalate
EVOH - Ethylene Vinyl Alcohol Copolymer (ethylene content 21%–44%)
MXDA - Metaxylene Diamine/Adipic Acid polycondensation polymer
PA-6 - Nylon (Polyamide 6)
PEN - Poly(ethylene-2,6-napthalenedicarboxylate)

Heat sealable polyethylene terephthalate currently include an acid modified polyethylene terephthalate, such as CRYSTAR® 4486 sold by DUPONT, glycol-modified polyethylene terephthalate, such as KODABOND® PETG sold by Eastman Chemical.

The bracketing of the above-structures indicate that during formation, these materials are coextruded together.

Trials were run confirming that polyethylene terephthalate adhered directly to ethylene vinyl alcohol copolymer without the necessity of using tie layers. This is significant in that polyethylene terephthalate is recyclable and tie layers are not recyclable or degradable. Where high barrier ethylene vinyl alcohol copolymer was utilized (29% ethylene content), only a small amount was required to provide desired barrier properties (moisture and oxygen) and still have the structure recyclable.

In addition, the use of polyethylene terephthalate in combination with ethylene vinyl alcohol copolymer without the use of a tie layer produces a superior blow molded bottle.

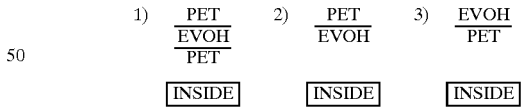

A thin layer of high barrier ethylene vinyl alcohol copolymer (29% ethylene content) is used between two layers of polyethylene terephthalate thereby producing a superior bottle structure for carbonated or non-carbonated beverages. A second blow molded bottle structure with polyethylene terephthalate as the outer layer and ethylene vinyl alcohol copolymer as the product contact layer would produce an excellent bottle for carbonated and non-carbonated beverages. A third structure is also contemplated wherein polyethylene terephthalate is the inside product contact layer and ethylene vinyl alcohol copolymer is the gloss layer.

A preferred polyethylene terephthalate for both paperboard and bottle structures is sold by Eastman Chemical under the name EASTACOAT® PET19860 polyethylene.

The bottle application is unique in that the polyethylene terephthalate bonds directly to the ethylene vinyl alcohol copolymer without non-recyclable environmentally unfriendly tie layers.

The above and other objects, features, and advantages of the present invention will become clear from the following description of the preferred embodiments thereof, taken in connection with the accompanying drawings.

DETAILED DESCRIPTION OF THE INVENTION

Figure 1:
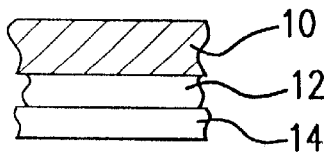
FIG. 1 is a cross-sectional view of a laminate structure for a container showing a preferred embodiment of the present invention.

A laminate structure for an improved container which has good moisture and barrier properties and superior structural integrity is depicted in FIG. 1. A paperboard substrate 10 has coated thereon a layer of ethylene vinyl alcohol copolymer and a layer of heat sealable polyethylene terephthalate as its matte layer. This structure has superior barrier properties and does not contain any polyolefin based tie materials which inhibit recyclability.

Figure 2:
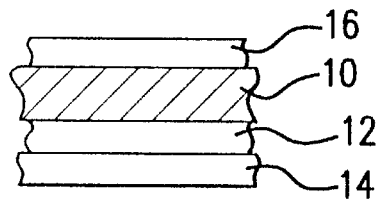
FIG. 2 is a cross-sectional view of a laminate structure for a container showing an alternate embodiment of the present invention.

FIG. 2 depicts the structure of FIG. 1, namely a structural substrate 10, a layer of ethylene vinyl alcohol copolymer 12 and a heat sealable layer of polyethylene terephthalate 14. Also provided is a gloss layer of heat sealable polyethylene terephthalate 16. The heat sealable polyethylene terephthalate gloss layer 16 is printable and does not require a tie layer for adhesion to the substrate.

Figure 3:
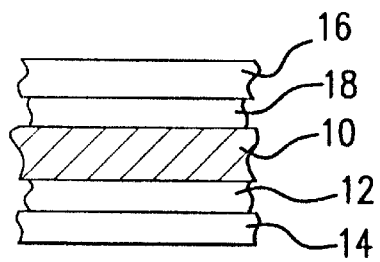
FIG. 3 is a cross-sectional view of a laminate structure for a container showing an alternate embodiment of the present invention.

FIG. 3 depicts an alternate embodiment of FIGS. 1 and 2 further including a layer of polyethylene terephthalate 18 coated between the structural substrate 10 and the gloss layer 16 of heat sealable polyethylene terephthalate.

Figure 4:
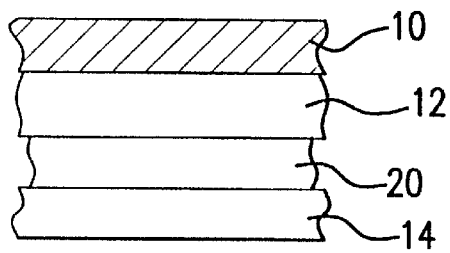
FIG. 4 is a cross-sectional view of a laminate structure for a container showing an alternate embodiment of the present invention.

FIG. 4 depicts an alternate preferred embodiment of the structure wherein a layer of polyethylene terephthalate 20 is provided and coated between the layer of ethylene vinyl alcohol copolymer 12 and the heat sealable polyethylene terephthalate matte layer 14.

Figure 5:
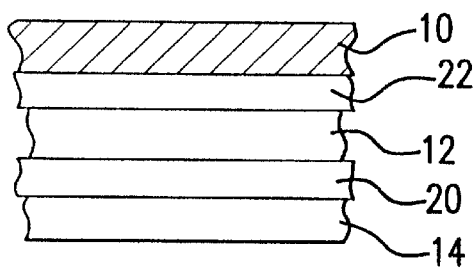
FIG. 5 is a cross-sectional view of a laminate structure for a container showing an alternate embodiment of the present invention.

FIG. 5 depicts an alternate embodiment of the structure wherein a second layer of polyethylene terephthalate 22 is coated between the ethylene vinyl alcohol copolymer layer 12 and the structural substrate layer 10.

Figure 6:
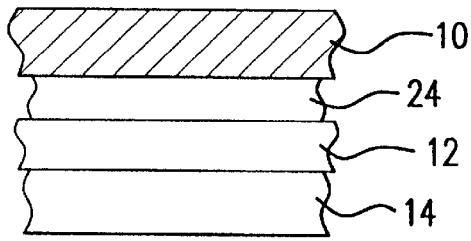
FIG. 6 is a cross-sectional view of a laminate structure for a container showing an alternate embodiment of the present invention.

FIG. 6 depicts an alternate embodiment of the structure wherein a structural substrate 10 is provided, coated thereon is a heat sealable layer of polyethylene terephthalate 24, and this structure further includes the ethylene vinyl alcohol copolymer layer 12 and the matte layer of heat sealable polyethylene terephthalate 14.

Figure 7:
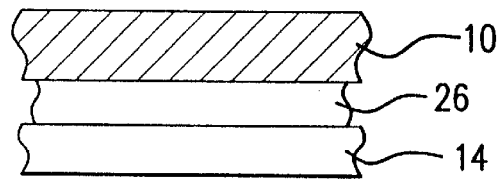
FIG. 7 is a cross-sectional view of a laminate structure for a container showing an alternate embodiment of the present invention.

FIG. 7 depicts an alternate embodiment of the structure as depicted in FIG. 1, wherein layer 12, namely the ethylene vinyl alcohol copolymer layer, is replaced with a blend layer of ethylene vinyl alcohol copolymer and metaxylene diamene/adipic acid polycondensation polymer.

Figure 8:
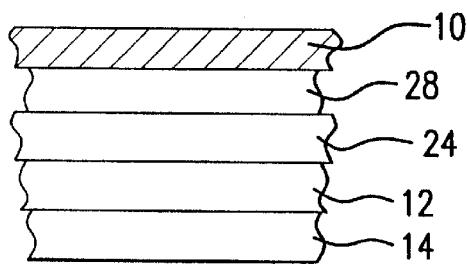
FIG. 8 is a cross-sectional view of a laminate structure for a container showing an alternate embodiment of the present invention.

FIG. 8 depicts an alternate embodiment of the invention wherein there is provided between the ethylene vinyl alcohol copolymer layer 12 and the structural substrate 10 a layer of heat sealable polyethylene terephthalate 24 and a layer of polyethylene terephthalate 28.

Figure 9:
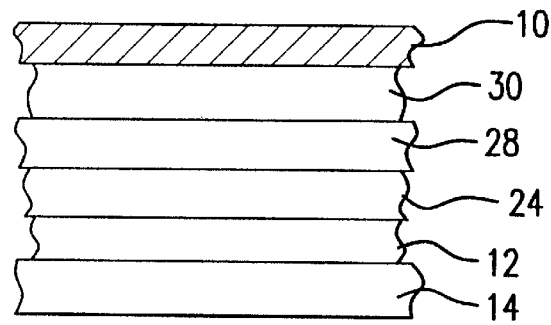
FIG. 9 is a cross-sectional view of a laminate structure for a container showing an alternate embodiment of the present invention.

FIG. 9 depicts an alternate embodiment of the structure depicted in FIG. 8 further including another layer of heat sealable polyethylene terephthalate 30 between the layer of polyethylene terephthalate 28 and the structural substrate layer 10.

Figure 10:
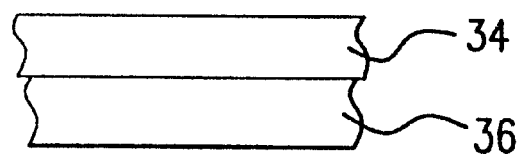
FIG. 10 is a cross-sectional view of a blow molded bottle structure showing an alternate embodiment of the present invention.
Figure 11:
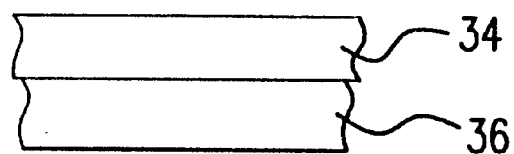
FIG. 11 is a cross-sectional view of a blow molded bottle structure showing an alternate embodiment of the present invention.
Figure 12:
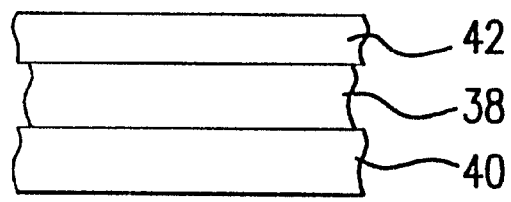
FIG. 12 is a cross-sectional view of a blow molded bottle structure showing an alternate embodiment of the present invention.

FIGS. 10–12 depict laminate structures for a blow molded bottle container structure. Provided is a layer of ethylene vinyl alcohol copolymer 34 and a layer of polyethylene terephthalate 36. As in the laminate structures for non blow molded containers, no polyolefin based tie layers are required for adhesion or formation of the laminate structure.

FIG. 11 depicts a like blow molded bottle structure although the materials are reversed wherein the ethylene vinyl alcohol copolymer is the matte layer and the polyethylene terephthalate is the gloss layer 38.

Finally, there is provided an alternate embodiment of the structure wherein both matte and gloss layers are polyethylene terephthalate, 40 and 42, and sandwiched therebetween without the requirement of a polyolefin or other tie based material is an ethylene vinyl alcohol copolymer 38.

Although several preferred embodiments of the invention have been specifically illustrated and described herein, it is to be understood that minor variations may be made in the layered construction of the structure without departing from the spirit and scope of the invention as defined by the appended claims.

What is claimed is:

1. A laminate structure for a container comprising:
   a) a structural substrate; and
   b) a two layer recyclable barrier layer, comprising a layer of heat sealable polyethylene terephthalate and a layer of ethylene vinyl alcohol copolymer, coated onto the substrate, wherein the laminate structure does not contain polyolefin based tie layers;

wherein the ethylene vinyl alcohol copolymer has an ethylene content ranging from 21–44 weight %.

2. The laminate structure of claim 1, further comprising an additional layer of heat sealable polyethylene terephthalate coated between the layer of ethylene vinyl alcohol copolymer and the substrate.

3. The laminate structure of claim 1, wherein the layer of ethylene vinyl alcohol copolymer is a blend layer with metaxylene diamine/adipic acid polycondensation polymer.

4. The laminate structure of claim 1, wherein the polyethylene terephthalate is an acid modified polyethylene terephthalate, a glycol modified polyethylene terephthalate, or non-modified polyethylene terephthalate.

5. The laminate structure of claim 1, further comprising an additional layer of heat sealable polyethylene terephthalate coated on the uncoated side of the structural substrate.

6. The laminate structure of claim 5, further comprising a layer of polyethylene terephthalate coated between the structural substrate and the additional layer of heat sealable polyethylene terephthalate.

7. The laminate structure of claim 1, further comprising a layer of polyethylene terephthalate coated between the layer of ethylene vinyl alcohol copolymer and the layer of heat sealable polyethylene terephthalate.

8. The laminate structure of claim 7, further comprising a second layer of polyethylene terephthalate coated between the layer of ethylene vinyl alcohol copolymer and the substrate.

9. The laminate structure of claim 1, further comprising a layer of polyethylene terephthalate between the additional layer of heat sealable polyethylene terephthalate and the substrate.

10. The laminate structure of claim 9, further comprising a third layer of heat sealable polyethylene terephthalate between the layer of polyethylene terephthalate and the substrate.

11. The laminate structure of claim 1, wherein the structural substrate is selected from bleached paperboard, unbleached paperboard, corrugated paperboard, high density polyethylene, propylene, or polyethylene terephthalate.

* * * * *